May 14, 1968     E. P. CIZEK     3,383,435

BLEND OF A POLYPHENYLENE ETHER AND A STYRENE RESIN

Filed Aug. 11, 1967

*INVENTOR.*
ERIC P. CIZEK
BY Robert L. Goldberg

ATTORNEYS

INVENTOR.
ERIC P. CIZEK
BY Robert F. Goldberg
ATTORNEYS

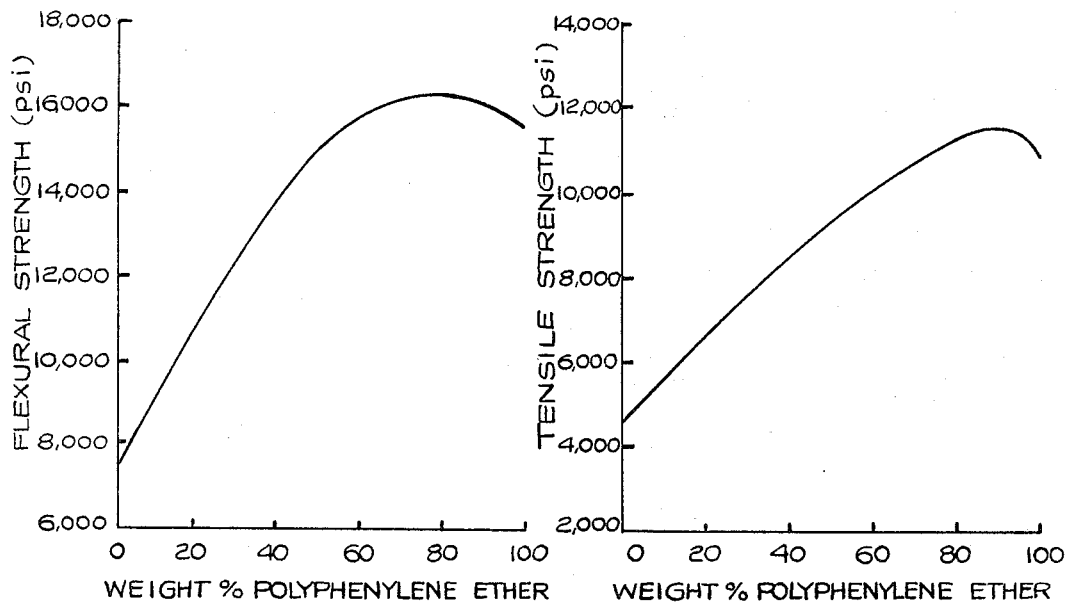
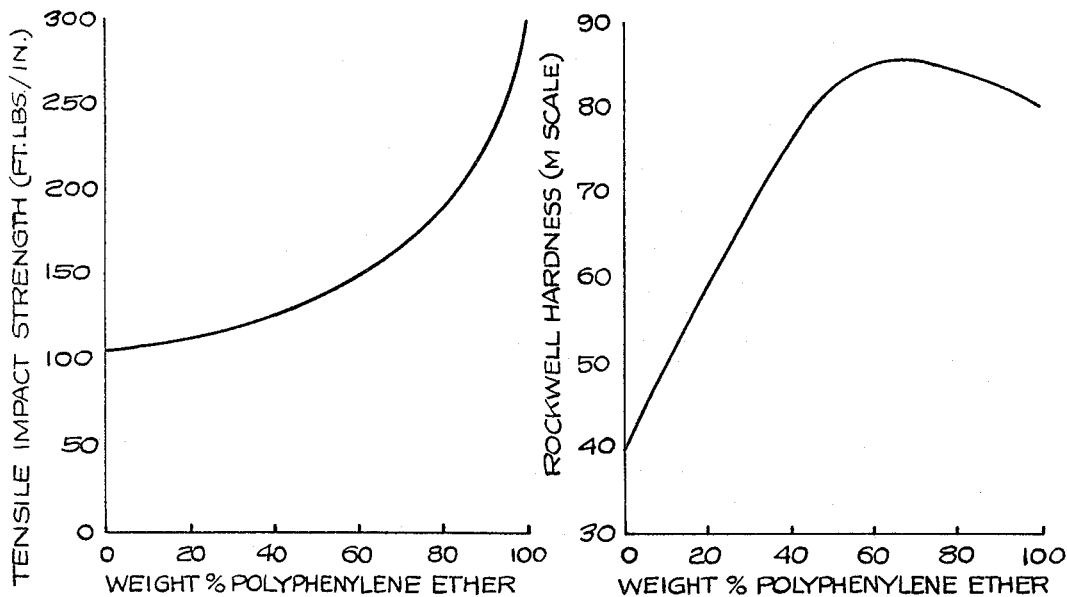

United States Patent Office 3,383,435
Patented May 14, 1968

3,383,435
BLEND OF A POLYPHENYLENE ETHER AND
A STYRENE RESIN
Eric P. Cizek, Ann Arbor, Mich., assignor to General
Electric Company, a corporation of New York
Continuation-in-part of application Ser. No. 423,702,
Jan. 6, 1965. This application Aug. 11, 1967, Ser.
No. 659,901
23 Claims. (Cl. 260—874)

ABSTRACT OF THE DISCLOSURE

A thermoplastic composition comprising a polyphenylene ether and a styrene resin. The mixture of polyphenylene ether and styrene resin provides a thermoplastic composition having many properties improved over those of the polyphenylene ether or styrene resin individually. In addition, with various systems, the ratio of styrene resin to polyphenylene ether provides a composition capable of custom formulation to predetermined properties ranging between those of the styrene resin and the polyphenylene ether.

Introduction

This application is a continuation-in-part of copending United States patent application Ser. No. 423,702, filed Jan. 6, 1965, now abandoned.

This invention relates to a thermoplastic composition comprising a blend of a styrene resin and a polyphenylene ether; the blend possessing many properties improved over those of either the styrene resin or polyphenylene ether.

Background of the invention

The polyphenylene ethers are known and described in numerous publications including U.S. Patents Nos. 3,306,874 and 3,306,875 of Allan S. Hay and U.S. Patents Nos. 3,257,357 and 3,257,358 of Gelu Stoeff Stamatoff. The high molecular weight polymers are high performance engineering thermoplastics possessing relatively high melt viscosities and softening points—i.e., in excess of 275° C., and are useful for many commercial applications requiring high temperature resistance including formation of film, fiber and molded articles. For many uses, the high performance properties are not necessary and the relatively high melt viscosities and softening points are a disadvantage. For example, film and fiber can only be formed on a commercial scale from solution; melt processing being commercially unattractive because of the required high temperatures needed to soften the polymer and the problems associated therewith such as instability, discoloration and the requirement for specially designed process equipment to operate at elevated temperatures. Molded articles can be formed by melt processing techniques, but again, the high temperatures required are undesirable.

Polystyrene, because of low cost and an overall combination of fair to good properties, has found wide and diversified commercial acceptance. However, polystyrene is brittle, possesses a relatively low heat distortion temperature and has relatively poor resistance to the more common organic solvents. It is known in the art that various properties of polystyrene may be improved by copolymerizing monomeric styrene with other monomers or by blending polystyrene with other resins. For example, polystyrene is frequently blended with rubber to overcome the disadvantage of brittleness. Solvent resistance has been imparted to polystyrene by copolymerization of monomeric styrene with acrylonitrile. Butadiene has been grafted onto styrene-acrylonitrile copolymers for added flexibility. Heretofore, modification of polystyrene in the above described manner has resulted in improvement in one or a few specific properties rather than in a general upgrading of the polymer.

Statement of the invention

The present invention provides a means for simultaneously upgrading many properties of polystyrene and improving the moldability of the polyphenylene ethers and is predicated upon the discovery that the polyphenylene ethers and polystyrene, including the modified polystyrenes as disclosed above, are combinable in all proportions resulting in thermoplastics compositions having many properties improved over those of either the polyphenylene ether or polystyrene alone.

As an additional advantage to this invention, it has been found that blending of polystyrene with many of the polyphenylene ethers allows for custom formulation of compositions having predetermined properties ranging between those of polystyrene and those of the polyphenylene ether by controlling the ratio of the two components. This is unexpected because blending of two polymers usually results in a composition displaying two distinct sets of properties—i.e., one for each of the resinous components.

As a further advantage of this invention, it has been found that blending a modified polystyrene with a polyphenylene ether provides a composition exhibiting the improvement resulting from modification of the polystyrene. For example, a blend of a polyphenylene ether with a styrene-acrylonitrile copolymer has a resistance to organic solvents superior to that of a blend formed from a polyphenylene ether and polystyrene.

Accordingly, an object of this invention is to provide a thermoplastic composition comprising a polyphenylene ether and a styrene resin where the disadvantages inherent in each of the polymers are substantially overcome.

Description of the invention

The polyphenylene ethers with which this invention is concerned are those having the repeating structural unit of the formula:

I

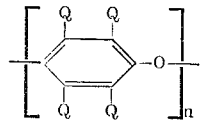

wherein the oxygen ether atom of one unit is connected to the benzene nucleus of the next adjoining unit, n is a positive integer and is at least 100, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, hydrocarbonoxy radicals being free of a tertiary α-carbon atom, and halohydrocarbonoxy radicals having at least 2 carbon atoms between the halogen atom and phenyl nucleus and being free of a tertiary α-carbon atom. Examples of suitable polymers may be found in the above referenced patents of Hay and Stamatoff.

The preferred polyphenylene ethers are those having alkyl substitution ortho to the oxygen ether atom and most preferably, ortho methyl substitution. These polymers are preferred because they combine with polystyrene to form fully compatible, homogeneous, mixtures.

The styrene resin is one having at least 25 percent, by weight, polymer units derived from the compound having the formula:

II

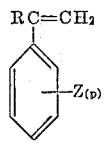

where R is hydrogen, lower alkyl or halogen; Z is a member selected from the class consisting of vinyl, hydrogen, chlorine and lower alkyl; and p is a whole number equal to from 0 to 5. The term "styrene resin" as used throughout this disclosure and in the claims, and defined by the above Formula II includes, by way of example, homopolymers such as polystyrene and polychlorostyrene, the modified polystyrenes such as rubber modified polystyrenes, and the styrene containing copolymers such as the styreneacrylonitrile copolymers (SAN), styrene-butadiene copolymers, styrene-acrylonitrile-α-alkyl styrene copolymers, styrene - acrylonitrile - butadiene copolymers (ABS), poly-α-methylstyrene, copolymers of ethylvinylbenzene and divinylbenzene, and the like. The preferred styrene resins are the high impact polystyrenes, the ABS copolymers and the SAN copolymers.

The method of blending the polyphenylene ether with the styrene resin is not critical and does not constitute a part of this invention. The preferred method comprises blending the two polymers in power or granular form, extruding the blend, chopping into pellets and re-extruding.

As noted above, the polyphenylene ethers and the styrene resins are combinable with each other in all proportions. Consequently, compositions comprising from 1 to 99 percent, by weight, polyphenylene ether and from 99 to 1 percent, by weight, styrene resin are included within the scope of the invention. In general, compositions containing from 40 to 85 percent polyphenylene ether and from 60 to 15 percent styrene resin exhibit the best overall combination of properties and these compositions are preferred.

The benefits obtained by blending a styrene resin with a polyphenylene ether are illustrated in the following examples which are set forth as further description of the invention, but are not to be construed as limiting the invention thereto.

Unless otherwise indicated, all blends were prepared having compositions varying from 100 percent polyphenylene ether and 0 percent styrene resin to 100 percent styrene resin and 0 percent polyphenylene ether by passing mixtures of the polymers through a variable pitch, single-screw extruder with extrusion temperature maintained between 450° and 550° F. dependent upon the particular polymers used. The strands emerging from the extruder were cooled, chopped into pellets, re-extruded, chopped into pellets and molded into test bars using standard procedures.

Example 1

Blends were prepared of a poly-(2,6-dimethyl-1,4-phenylene) ether, available under the trademark PPO from General Electric Company and a crystal polystyrene, available under the trademark Styron-666 from the Dow Chemical Company. The properties of the blend are illustrated in FIGS. 1 to 11 of the drawings wherein:

FIG. 1 represents the relationship between concentration and glass transition temperature for the blends. The single valued relationship is unexpected as normally, blending of two resins results in a composition exhibiting two distinct and separate glass transition temperatures, one for each of the components of the blend. For example, glass transition temperature for a blend of a polyamine and a polystyrene would be as depicted in FIG. 2 of the drawing. The single valued relationship obtained for the blend of the polyphenylene ether and polystyrene is believed to be due to the formation of a single phase or solid solution of the two polymers over their entire concentration range. This is highly unexpected and believed to be unique to the poly-(2,6-di-lower-alkyl-1,4-phenylene) ether-crystalling polystyrene systems. Substitutions of other polyphenylene ethers for the poly-(2,6-dialkyl-1,4-phenylene) ethers or other styrene resins for crystal polystyrene will provide compositions with properties improved over those of crystal polystyrene and melt viscosities below that of the polyphenylene ether.

FIG. 3 illustrates the relationship between heat distortion temperature and composition determined using the procedures of ASTM D648 at 264 p.s.i. The single valued relationship allows for selection of a composition having a predetermined heat distortion temperature by regulation of the concentration of each component in the blend. For example, if a composition having a heat distortion temperature of 135° C. is desired, it may be obtained from a composition having about 60 percent polyphenylene ether and 40 percent polystyrene. Consequently, blends having molding properties between that of the polyphenylene ether and polystyrene can be custom formulated.

All of the above figures illustrate the single valued relationship between composition and property. Of significance with respect to FIGS. 4 to 7 is the disproportionate improvement in properties of the blend over its components for a major portion of the concentration range; the blend exhibiting a property maxima in excess of that of either component. For example, in FIG. 4 compositions containing in excess of about 30 percent polyphenylene ether have flexural strengths in excess of the flexural strength of either polystyrene or the polyphenylene ether.

As an additional advantage to the blend, it was found that polystyrene addition increases melt stability of the polyphenylene ether with melt viscosity of the blend remaining substantially constant at elevated temperatures. The melt viscosity of the polyphenylene ether alone increases substantially at temperatures in excess of 300° C.

Examples 2–6

Substitution of other polyphenylene ethers having 2,6-dialkyl substitution on the phenylene nucleus for 2,6-dimethyl-1,4-phenylene ether will provide compositions having properties similar to the properties exhibited by the composition of claim 1. Exemplary of other 2,6-dialkyl substituted polyphenylene ethers are:

poly-(2,6-diethyl-1,4-phenylene) ether
poly-(2-methyl-6-ethyl-1,4-phenylene) ether
poly-(2-methyl-6-propyl-1,4-phenylene) ether
poly-(2,6-dipropyl-1,4-phenylene)ether
poly-(2-ethyl-6-propyl-1,4-phenylene) ether As the length of the side chain increases, the solid solution is lost and the blend forms two separate phases. The single valued relationship between composition and properties begins to disappear over the mid-portions of the concentration range.

Because single phase systems are formed using 2,6-lower alkyl substituted polyphenylene ethers and polystyrene, blends of these components constitute a preferred embodiment of this invention with the composition formed from poly-(2,6-dimethyl-1,4-phenylene) ether and polystyrene being the most preferred embodiment of the invention.

Example 7

Figure 1:
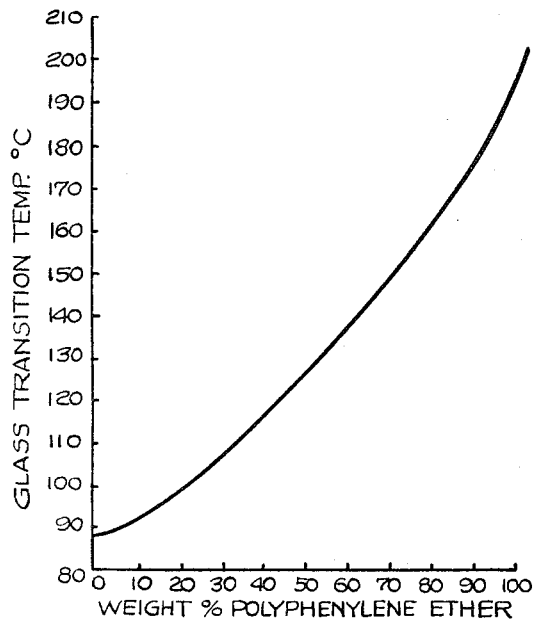
Figure 2:
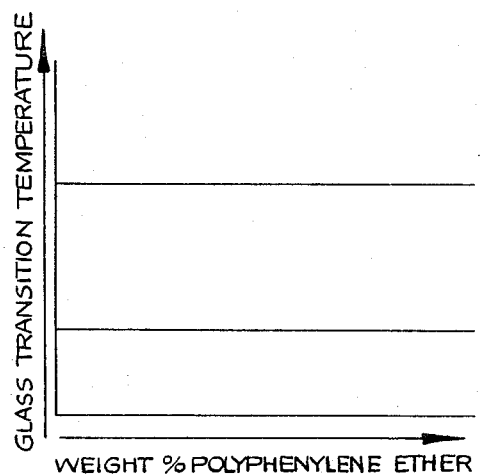
Figure 3:
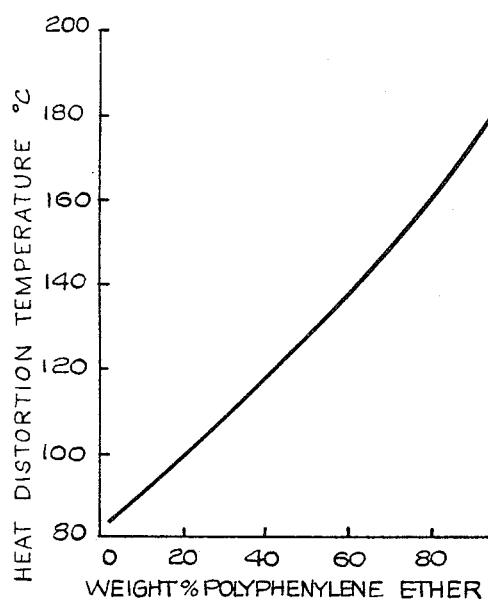
Figure 4:
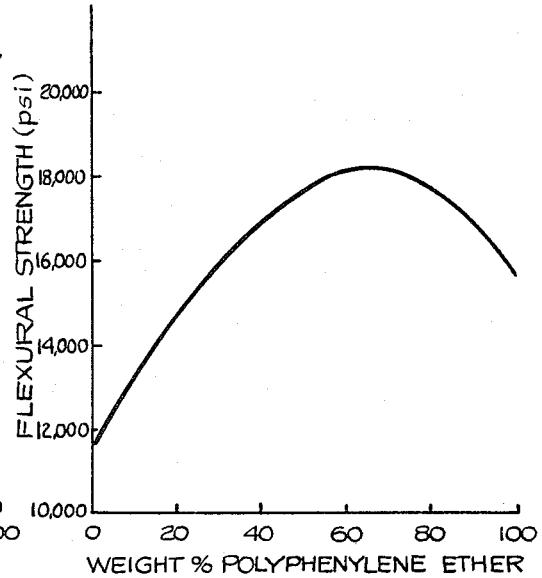
FIG. 4 represents the relationship between composition and flexural strength determined using the procedures of ASTM D790.
Figure 5:
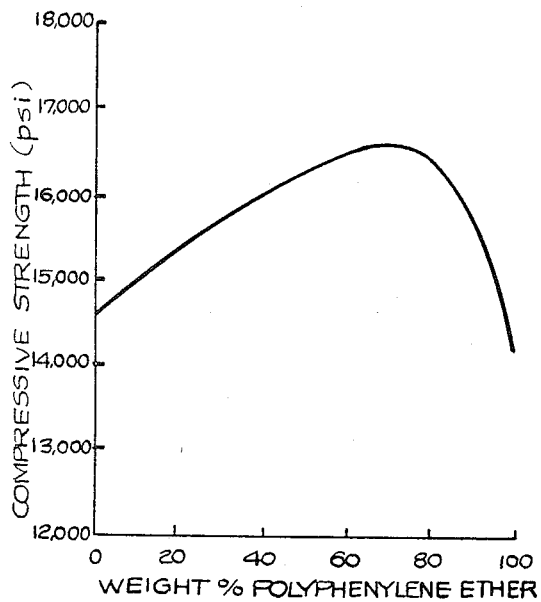
FIG. 5 represents the relationship between composition and compressive strength determined using the procedure set forth in ASTM D695.
Figure 6:
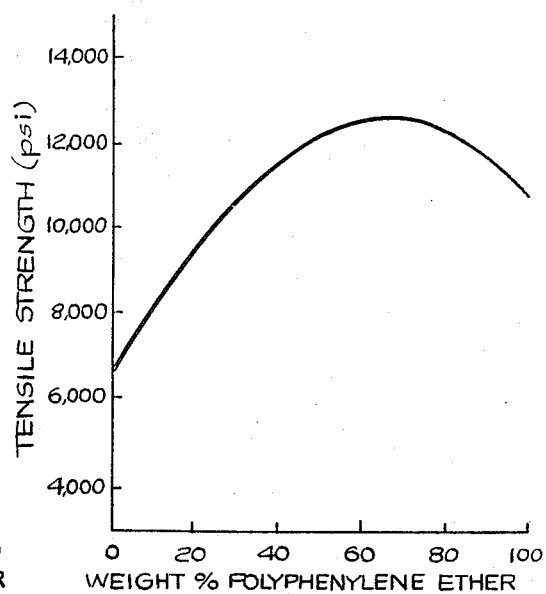
FIG. 6 illustrates the relationship between composition and tensile strength determined using the procedure set forth in ASTM D638 at yield point.
Figure 7:
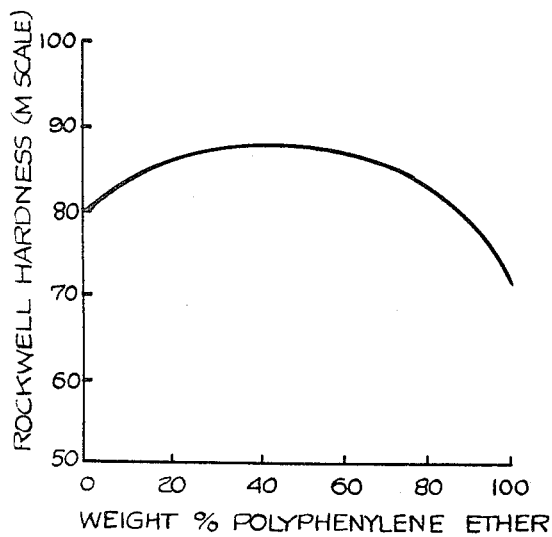
FIG. 7 represents the relationship between composition and Rockwell hardness determined using the procedure set forth in ASTM D785.
Figure 8:
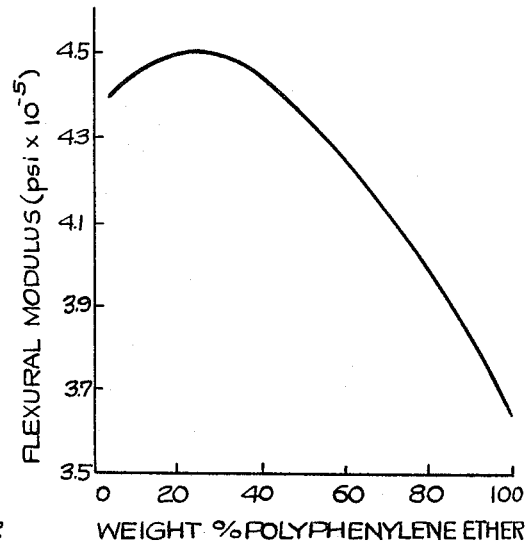
FIG. 8 represents the relationship between composition and flexural modulus determined using the procedure of ASTM D740.
Figure 9:
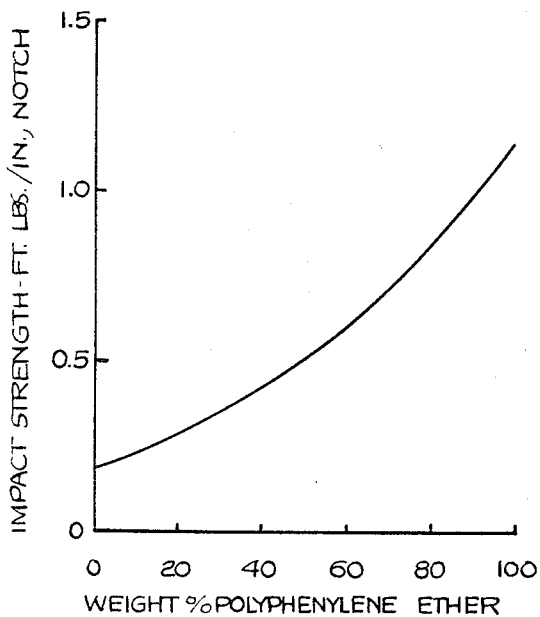
FIG. 9 represents the relationship between composition and Izod impact strength determined using the procedure set forth in ASTM D256 with a notched one-quarter inch bar.
Figure 10:
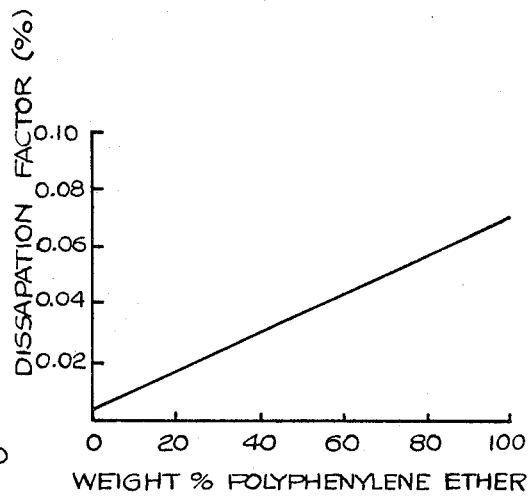
FIG. 10 represents the relationship between composition and dissipation factor determined at 60 cycles per second and 23° C. using the procedure of ASTM D150.
Figure 11:
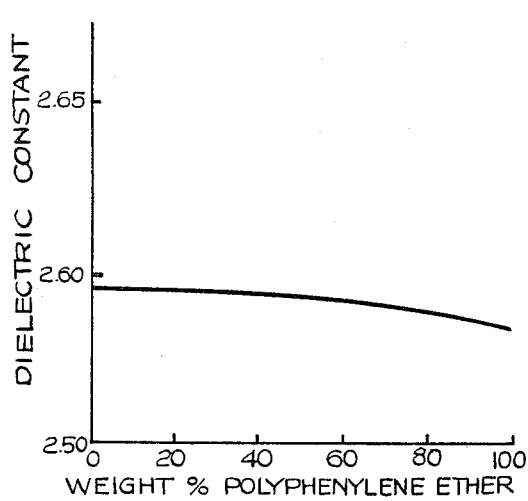
FIG. 11 represents the relationship between composition and dielectric constant determined at 60 cycles per second and 23° C. using the procedures of ASTM D150.
Figure 12:
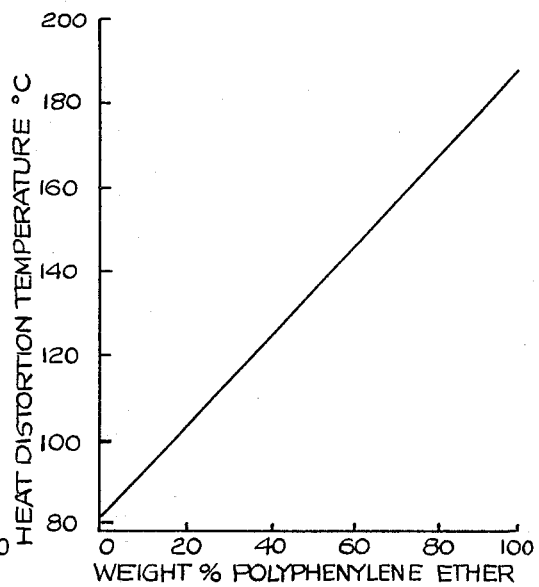

The procedure of Example 1 was repeated with the substitution of a rubber modified high-impact polystyrene identified as Lustrex HT88–1 of Monsanto Chemical Company for Styron-666. The results obtained are illustrated in FIGS. 12 to 18 wherein:

FIG. 12 represents the relationship between composition and heat distortion temperature determined using the procedure of ASTM D648 at 264 p.s.i.

FIG. 13 represents the relationship between composition and flexural strength determined using the procedure of ASTM D790.

FIG. 14 represents the relationship between composition and tensile strength determined using the procedures of ASTM D635.

FIG. 15 represents the relationship between composition and tensile impact strength determined using the procedure of ASTM D1822.

FIG. 16 represents the relationship between composition and Rockwell hardness determined using the procedure of ASTM D785.

Figure 17:
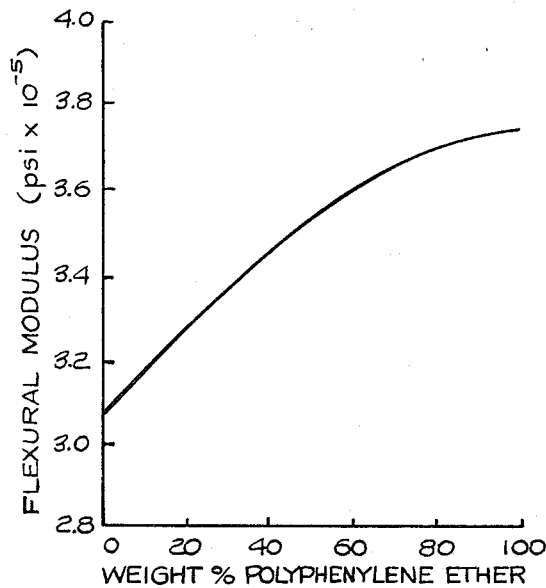

FIG. 17 represents the relationship between composition and flexural modulus determined using the procedure of ASTM D740.

Figure 18:
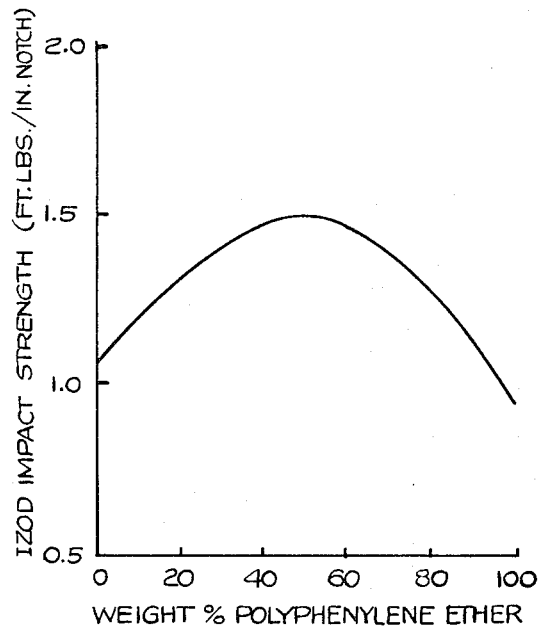

FIG. 18 represents the relationship between composition and impact strength determined using the procedure of ASTM D256 with a notched one-quarter inch bar.

As illustrated by the drawings, blends of the polyphenylene ether and a high impact polystyrene exhibit a property maxima in excess of that of either component for much of the concentration range. Also, the relationship between composition and property is single valued indicating formation of a single phase.

Example 8

Substitution of poly-α-methylstyrene for crystal polystyrene yields a blend having properties comparable to those depicted in Example 1.

Example 9

A composition was prepared containing approximately 50 percent, by weight, poly-(2,6-dimethyl-1,4-phenylene) ether, 40 percent, by weight, crystal polystyrene, and 10 percent, by weight, butadiene rubber. The following table represents a property profile for the composition:

| Property | ASTM Procedure | Value |
|---|---|---|
| Tensile Strength, p.s.i. | D638 | |
|   Yield | | 8,000 |
|   Ultimate | | 6,900 |
| Tensile Elongation, Percent Ultimate | D732 | 38 |
| Shear Strength, p.s.i. | D732 | 8,000 |
| Flexural modulus, p.s.i., 73° F. | D790 | 300,000 |
| Water Absorption, Percent, 24 hrs. 73° F. | D570 | 0.14 |
| Tensile Stress Relaxation, Percent Reduction, 15 hrs. at 5,000 p.s.i. | D674 | 31.0 |
| Rockwell Hardness M scale | D785 | 50 |
| Taber Abrasion, 1,000 grs., 10,000 cycles, mg. | D1044 | 35 |
| Mold Shrinkage, in./in. | D1299 | 0.007 |
| Izod Impact Strength, ft. lbs./in., ½″ bar. | D256 | 5.5 |
| Melt Viscosity, poise 1,500 sec.⁻¹ | Instron | 2,700 |
| Heat Distortion Temperature 264 p.s.i.° C. | D648 | 122 |
| Flammability | D635 | (¹) |
| Compressive strength, p.s.i. | D695 | 10,500 |
| Coefficient of Linear Thermal Expansion, in./in.° F. ×10⁻⁵. | D696 | 4.3 |
| Arc Resistance, Secs. | D495 | 75 |
| Dielectric Strength, v.p.m. ⅛″ | D149 | 720 |
| Volume Resistivity, ohm cm | D257 | 1,017 |
| Dielectric Constant, 50% RH, 73° F. 60 c.p.s. | D150 | 2.60 |
| Dissipation Factor, 50% RH, 73° F. 60 c.p.s. | D150 | 0.0007 |

¹ Self-extinguishing.

Example 10

Samples were prepared from a poly-(2,6-dimethyl-1,4-phenylene)-ether and a styrene-acrylonitrile copolymer (SAN) containing 27 percent acrylonitrile units and 73 percent styrene units and identified by the trademark TYRIL 767 by Dow Chemical Company. The polyphenylene ether and the SAN copolymer, both in fine granular form, were tumbled in a drum for a period of 24 hours at relatively high speed. The resultant mixture was extruded at a temperature of approximately 600° F. into a water bath. The cooled, extruded strands were chopped into pellets and molded into test bars measuring 2½ inches by ½ inch by ⅛ inch, using a Newbury Press at a temperature varying between 430° F. and 575° F. dependent upon sample composition, and a mold temperature of 200° F.

Acrylonitrile is copolymerized with styrene to improve the resistance of the styrene resins to organic solvents. Combination of the SAN copolymers with the polyphenylene ethers results in compositions having many of the benefits obtained from polystyrene as well as improved resistance to organic solvents, though the presence of acrylonitrile in the chain causes the formation of a two-phase blend, each phase readily detectable in compositions containing less than 70 percent of the polyphenylene ether.

To determine the environmental craze-resistance of the molded bars formed from the blend of the polyphenylene ether and SAN copolymer, samples were immersed for 3 minutes in an organic solvent known to be detrimental to the polyphenylene ethers. A strain was placed on each immersed sample and the maximum level of strain which can be applied to a sample in each environment for 3 minutes without developing craze or stress-cracking is determined. The formulations tested and the environmental testing results are set forth in the following table:

| Sample Identification | Composition Wt. Percent Polyphenylene Ether | SAN | Maximum Strain | |
|---|---|---|---|---|
| | | | Gasoline | Heptane |
| A | 100 | 0 | (¹) | (¹) |
| B | 95 | 5 | (¹) | (¹) |
| C | 90 | 10 | (¹) | 0.15 |
| D | 85 | 15 | 0.10 | 0.20 |
| E | 80 | 20 | 0.15 | 0.30 |
| F | 75 | 25 | 0.20 | 0.37 |
| G | 70 | 30 | 0.20 | 0.40 |
| H | 65 | 35 | 0.25 | 0.40 |
| I | 50 | 50 | 0.30 | 0.45 |
| J | 35 | 65 | 0.35 | 0.50 |
| K | 15 | 85 | 0.35 | 0.60 |
| L | 0 | 100 | 0.40 | 0.65 |

¹ Craze/no strain.

The maximum strain in all cases necessary to cause either cracking or crazing increased as the concentration of the SAN copolymer increased. With SAN content equal to zero, the part crazed without strain on the samples.

The following table illustrates various physical properties of the above polymer blends, all measured using standard ASTM procedures.

| Sample Identification | Heat Distortion Temperature, °C. | Tensil Stress to Rupture p.s.i.×10⁻³ | Flexural Strength, p.s.i.×10⁻⁴ |
|---|---|---|---|
| A | 196 | 10.4 | 1.6 |
| B | 196 | 10.5 | 1.6 |
| C | 191 | 10.7 | 1.6 |
| D | 192 | 10.9 | 1.6 |
| E | 190 | 11.0 | 1.8 |
| F | 188 | 11.0 | 1.8 |
| G | 155 | 11.2 | 1.6 |
| H | 125 | 11.4 | 1.7 |
| I | 120 | 11.5 | 1.7 |
| J | 115 | 11.5 | 1.8 |
| K | 110 | 11.8 | 1.9 |
| L | 105 | 12.0 | 1.9 |

Example 11

Butadiene is copolymerized with styrene and styrene acrylonitrile mixtures to impart flexibility to polystyrene and SAN copolymers respectively. It has been found that styrene resins containing butadiene increases the flexibility of blends with the polyphenylene ethers.

Samples were prepared from a poly-(2,6-dimethyl-1,4-phenylene)-ether and an ABS copolymer containing 16 percent acrylonitrile units, 41 percent styrene units, and 43 percent butadiene units. The polyphenylene ether and the ABS, both in fine, granular form, were tumbled in a drum for a period of 3 to 4 hours at relatively high speeds. The resulting mixtures were extruded at a temperature of approximately 600° F. into a water bath. The cooled extruded strands were chopped into pellets and molded into test bars measuring 2½ inches by ½ inch by ⅛ inch, using a Newbury Press at a temperature varying between 530° F. and 575° F., dependent upon the sample composition, and a mold temperature of 200° F.

The following table illustrates various physical properties of the polymer blends, all measured using standard ASTM procedures.

| Sample Identification | Composition Wt. Percent Polyphenylene Ether | ABS | Heat Distortion Temp., °C./264 p.s.i. | Tensile Elongation to Rupture | Flex. Strength, p.s.i.×10⁻⁴ | Tensile Stress, Percent Rupture, p.s.i.×10⁻³ |
|---|---|---|---|---|---|---|
| M | 100 | 0 | 185 | 65 | 1.60 | 9.8 |
| N | 95 | 5 | 179 | 100 | 1.58 | 9.4 |
| O | 90 | 10 | 177 | 120 | 1.52 | 9.7 |
| P | 85 | 15 | 175 | 135 | 1.45 | 10.2 |
| Q | 80 | 20 | 170 | 140 | 1.40 | 10.4 |
| R | 75 | 25 | 172 | 150 | 1.40 | 10.6 |
| S | 70 | 30 | 168 | 155 | 1.37 | 10.5 |
| T | 65 | 35 | 170 | 170 | 1.38 | 11.2 |
| U | 50 | 50 | 140 | 180 | 1.30 | |
| V | 25 | 75 | 112 | 190 | 1.12 | |
| W | 0 | 100 | 105 | 195 | 0.85 | |

To determine the environmental craze resistance of the molded bars, samples were submerged for three minutes in an organic liquid known to be detrimental to the polyphenylene ethers. A strain was placed on each immersed sample and the maximum level of strain which can be applied to a sample in each environment for 3 minutes, without developing craze or stress cracking was determined. The formulations tested and the environmental testing results are set forth in the following table:

| Sample Identification | Maximum Strain | | Gasoline |
|---|---|---|---|
| | Acetone | Hexane | |
| M | (¹) | (¹) | (¹) |
| N | 2.00 | 0.30 | (¹) |
| O | 2.85 | 1.00 | 0.07 |
| P | 3.00 | 1.00 | 0.15 |
| Q | 3.20 | 1.05 | 0.20 |
| R | 3.35 | 0.95 | 0.18 |
| S | 2.65 | 1.00 | 0.50 |
| U | 1.60 | 1.00 | 0.50 |
| W | 1.40 | 0.90 | 0.55 |

¹ Craze/no strain.

The data is somewhat erratic, but does establish that the presence of ABS in the formulation results in compositions having resistance to aggressive organic environments improved over the resistance of either the polyphenylene ether or polystyrene.

Example 12

Substitution of optically clear ABS for ABS yields a blend having properties comparable to those depicted in Example 11.

Examples 13 to 17

Compositions comprising a poly-(2,6-dimethyl-1,4-phenylene) ether and any of the following styrene resins will have physical properties similar to those of Example 10:

Styrene-α-methylstyrene copolymer
Styrene-coumarine-indene copolymer
Styrene-methylmethacrylate copolymer
Poly-α-chlorostyrene
Styrene-acrylonitrile-α-methylstyrene copolymers Examples 18 to 34

Compositions comprising polystyrene and any of the following polyphenylene ethers will be more readily moldable than the polyphenylene ether alone:

poly-(2,6-dilauryl-1,4-phenylene) ether
poly-(2,6-diphenyl-1,4-phenylene) ether
poly-(2,6-dimethoxy-1,4-phenylene) ether
poly-(2,3,6-trimethyl-1,4-phenylene) ether
poly-(2,3,5,6-tetrapropyl-1,4-phenylene) ether
poly-(2,6-diethoxy-1,4-phenylene) ether
poly-(2-methoxy-6-ethoxy-1,4-phenylene) ether
poly-(2-ethyl-5-stearyloxy-1,4-phenylene) ether
poly-(2,6-dichloro-1,4-phenylene) ether
poly-(2,3-dimethyl-5-chloro-1,4-phenylene) ether
poly-(2-methyl-6-phenyl-1,4-phenylene) ether
poly-(2,6-dibenzyl-1,4-phenylene) ether
poly-(3-chloro-1,4-phenylene) ether
poly-(3,5-diethyl-1,4-phenylene) ether
poly-(3-ethoxy-1,4-phenylene) ether
poly-(2-chloro-1,4-phenylene) ether
poly-(2,5-dibromo-1,4-phenylene) ether Because of their excellent physical, mechanical, chemical, electrical, and thermal properties, the polymer blends of this invention have many and varied uses. For example, they can be used in molding powder formulations, either alone or mixed with other polymers such as the polyolefine and may contain various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses in the form of sheets, rods, tapes, etc. and are useful in electrical applications, such as in cable terminals, terminal blocks, backing for electrical circuits, as components of dynamoelectric machines that operate at high temperatures, etc. Films of these materials can be prepared by suitable means, such as by calendering, extrusion, etc. These films are useful as metal or fiber liners, containers, covers, closures, electrical insulating tapes, as sound recording tapes, magnetic tapes, photographic films, pipe and wire tapes, etc. As a coating material, they can be applied as a solution or suspension to any convenient foundation where a surface possessing their excellent properties is desired. They can be used as an encapsulation material, for electrical insulation, for example, as a wire enamel, potting compound, etc. Fibers produced from the polymers can be woven into fabrics, useful in many applications, for example, as filter cloths where high chemical and heat-resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc. such as dyes, pigments, stabilizers, plasticizers, etc.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:
1. A thermoplastic blended composition consisting essentially of
(a) from 1.0 to 99 per cent of a polyphenylene ether of the formula

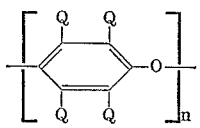

where the oxygen ether atom of one unit is connected to the benzene nucleus of the next repeating unit, $n$ is a positive integer and is at least 100, and each Q is a monovalent substituent selected from the group consisting of hydrogen, halogen, hydrocarbon radicals free of a tertiary α-carbon atom, halohydrocarbon radicals having at least two carbon atoms between the halogen atom and phenyl nucleus and being free of a tertiary α-carbon atom, hydrocarbonoxy radicals being free of a tertiary α-carbon atom, and halohydrocarbonoxy radical having at least 2 carbon atoms between the halogen atom and phenyl nucleus and being free of a tertiary α-carbon atom; and
(b) from 99 to 1.0 percent of a styrene resin having at least 25 percent polymer units derived from the compound having the formula

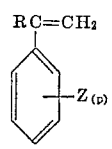

where R is selected from the group consisting of hydrogen, lower alkyl and halogen, Z is a member selected from the group consisting of hydrogen, lower alkyl, chlorine and vinyl, and $p$ is a whole integer equal to from 1 to 5.

2. The composition of claim 1 where the polyphenylene ether is a poly-(2,6-dialkyl-1,4-phenylene) ether.

3. The composition of claim 1 where the polyphenylene ether is a poly-(2,6-dimethyl-1,4-phenylene) ether.

4. The composition of claim 1 where the polyphenylene ether is poly-(2,6-diethyl-1,4-phenylene) ether.

5. The composition of claim 1 where the polyphenylene ether is poly-(2,6-diphenyl-1,4-phenylene) ether.

6. The composition of claim 1 where the styrene resin is crystalline polystyrene.

7. The composition of claim 1 where the styrene resin is rubber modified high impact polystyrene.

8. The composition of claim 1 where the styrene resin is a styrene-acrylonitrile copolymer.

9. The composition of claim 1 where the styrene resin is a styrene-acrylonitrile-butadiene copolymer.

10. The composition of claim 1 where the styrene resin is a styrene-coumarine-indene copolymer.

11. A thermoplastic blended composition consisting essentially of
(a) from 1.0 to 99 percent of a polyphenylene ether of the formula

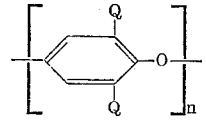

where Q is an alkyl of from 1 to 4 carbon atoms and $n$ is a whole integer of at least 100; and
(b) from 99 to 1.0 percent of a styrene resin having at least 25 percent polymer units derived from the compound having the formula

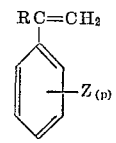

where R is selected from the group consisting of hydrogen, lower alkyl and halogen, Z is a member selected from the group consisting of hydrogen, lower alkyl and vinyl, and $p$ is a whole integer equal to from 1 to 5.

12. The composition of claim 11 where the polyphenylene ether is poly-(2,6-dimethyl-1,4-phenylene) ether.

13. The composition of claim 12 where the styrene resin is crystalline polystyrene.

14. The composition of claim 12 where the styrene resin is a styrene-acrylonitrile copolymer.

15. The composition of claim 12 where the styrene resin is a styrene-acrylonitrile-butadiene copolymer.

16. The composition of claim 12 where the styrene resin is a rubber modified high impact polystyrene.

17. The composition of claim 16 where the polyphenylene ether constitutes from 40 to 85 percent of the composition and the polystyrene constitutes from 60 to 15 percent of the composition.

18. A thermoplastic blended composition consisting essentially of from 1.0 to 99 percent of a poly-(2,6-dimethyl-1,4-phenylene) ether and from 99 to 1.0 percent of a styrene resin having at least 25 percent polymer units derived from the compound having the formula

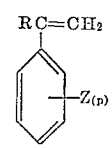

where R is selected from the group consisting of hydrogen, lower alkyl and halogen, Z is a member selected from the group consisting of hydrogen, lower alkyl and vinyl, and $p$ is a whole integer equal to from 1 to 5.

19. The composition of claim 18 where the styrene resin is crystalline polystyrene.

20. The composition of claim 18 where the styrene resin is a rubber modified high impact polystyrene.

21. The composition of claim 18 where the styrene resin is styrene-acrylonitrile copolymer.

22. The composition of claim 18 where the styrene resin is styrene-acrylonitrile-butadiene copolymer.

23. The composition of claim 20 where they polyphenylene ether constitutes from 40 to 85 percent of the composition and the polystyrene constitutes from 15 to 60 percent of the composition.

References Cited

UNITED STATES PATENTS

| | | | |
|---|---|---|---|
| 3,225,118 | 12/1965 | De'Melio | 260—874 |
| 3,332,910 | 7/1967 | Muddle | 260—47 |
| 3,356,761 | 12/1967 | Fox | 260—874 |

MURRAY TILLMAN, *Primary Examiner.*

M. J. TULLY, *Assistant Examiner.*

Dedication 3,383,435.—*Erick P. Cizek*, Ann Arbor, Mich. BLEND OF A POLYPHENYLENE ETHER AND A STYRENE RESIN. Patent dated May 14, 1968. Dedication filed Nov. 14, 1979, by the assignee, *General Electric Company*.

Hereby dedicates to the Public claims 1, 2, 3, 4, 5, 6, 7, 8, 9, 10, 11, 12, 13, 14, 15, 18, 19, 21 and 22 of said patent.

[*Official Gazette, March 18, 1980.*]